US012715133B2

United States Patent
(12) United States Patent
Tanaka

(10) Patent No.: US 12,715,133 B2
(45) Date of Patent: Aug. 25, 2026

(54) SETTING DEVICE, SETTING METHOD, AND NON-TRANSITORY COMPUTER-READABLE STORAGE MEDIUM STORING SETTING PROGRAM

(71) Applicant: SEIKO EPSON CORPORATION, Tokyo (JP)

(72) Inventor: Dai Tanaka, Matsumoto (JP)

(73) Assignee: SEIKO EPSON CORPORATION (JP)

(*) Notice: Subject to any disclaimer, the term of this patent is extended or adjusted under 35 U.S.C. 154(b) by 73 days.

(21) Appl. No.: 18/617,699

(22) Filed: Mar. 27, 2024

(65) Prior Publication Data

US 2024/0326251 A1 Oct. 3, 2024

(30) Foreign Application Priority Data

Mar. 28, 2023 (JP) ................................ 2023-052113

(51) Int. Cl.
*B25J 9/16* (2006.01)
*B25J 13/00* (2006.01)

(52) U.S. Cl.
CPC ............. *B25J 9/1676* (2013.01); *B25J 13/00* (2013.01); *B25J 9/1656* (2013.01); *B25J 9/1666* (2013.01); *G05B 2219/40478* (2013.01)

(58) Field of Classification Search
CPC ........ B25J 9/1676; B25J 13/00; B25J 9/1656; B25J 9/1666; B25J 9/046; G05B 2219/40478
See application file for complete search history.

(56) References Cited

U.S. PATENT DOCUMENTS

| | | | | |
|---|---|---|---|---|
| 2009/0091286 | A1 | 4/2009 | Nihei et al. | |
| 2010/0292843 | A1 | 11/2010 | Kariyazaki et al. | |
| 2017/0355079 | A1* | 12/2017 | Takahashi | B25J 9/1676 |
| 2018/0029232 | A1* | 2/2018 | Ouchi | B25J 9/1671 |
| 2018/0250816 | A1* | 9/2018 | Kogawara | B25J 9/1666 |

(Continued)

FOREIGN PATENT DOCUMENTS

| | | |
|---|---|---|
| JP | H01-016395 | 1/1989 |
| JP | 2009-090403 A | 4/2009 |

(Continued)

OTHER PUBLICATIONS

Abb Robotics Application manual—Functional safety and SafeMove2; RobotWare 6.15.08; Document ID: 3HAC052610-001; Revision: Y; Sep. 14, 2020 (248 pages).

*Primary Examiner* — Sohana Tanju Khayer
(74) *Attorney, Agent, or Firm* — Harness, Dickey & Pierce, P.L.C.

(57) ABSTRACT

A setting device includes a display section configured to display a restriction region setting image including a first input section for selecting and inputting either a restriction region of a permitted region where intrusion of a robot arm of a robot is permitted or a prohibited region where intrusion of the robot arm is prohibited and a second input section for inputting a boundary of the restriction region; an acquisition section configured to acquire setting information input and set in the first input section and the second input section; and a process section configured to set the restriction region for the robot arm based on the setting information acquired by the acquisition section.

6 Claims, 9 Drawing Sheets

(56) References Cited

U.S. PATENT DOCUMENTS

| | | | | |
|---|---|---|---|---|
| 2018/0292805 | A1 | 10/2018 | Endou | |
| 2020/0225673 | A1* | 7/2020 | Ebrahimi Afrouzi | A47L 11/4011 |
| 2020/0306968 | A1* | 10/2020 | Ueyama | B25J 9/1676 |
| 2021/0078176 | A1* | 3/2021 | Hoshiyama | B25J 9/163 |
| 2021/0262820 | A1* | 8/2021 | Chhajer | G06F 3/1462 |
| 2022/0066456 | A1* | 3/2022 | Ebrahimi Afrouzi | G06F 3/04883 |
| 2023/0385650 | A1* | 11/2023 | Minamoto | G06N 3/045 |
| 2024/0033923 | A1* | 2/2024 | Jung | G06T 7/73 |
| 2024/0066699 | A1* | 2/2024 | Oshiro | B25J 9/1666 |
| 2024/0310851 | A1* | 9/2024 | Ebrahimi Afrouzi | G01S 17/87 |
| 2025/0109963 | A1* | 4/2025 | Kim | G01C 21/206 |

FOREIGN PATENT DOCUMENTS

| | | | |
|---|---|---|---|
| JP | 2010-162622 | A | 7/2010 |
| JP | 2018-180725 | A | 11/2018 |
| WO | 2009/072383 | A1 | 6/2009 |

* cited by examiner

SETTING DEVICE, SETTING METHOD, AND NON-TRANSITORY COMPUTER-READABLE STORAGE MEDIUM STORING SETTING PROGRAM

The present application is based on, and claims priority from JP Application Serial Number 2023-052113, filed Mar. 28, 2023, the disclosure of which is hereby incorporated by reference herein in its entirety.

BACKGROUND

1. Technical Field

The present disclosure relates to a setting device, a setting method, and a setting program.

2. Related Art

In recent years, due to an increase in labor costs and a shortage of human resources in a factory, operations such as manufacturing, processing, and assembling have been performed by a robot including a robot arm, and automation of operations that have been performed manually has been attempted. As described in JP-A-2018-180725, such a robot may be used, for example, by setting a region in which a robot arm is prohibited from intruding, that is, an operation prohibited region, prior to operating the robot arm so as not to collide with an obstacle during operation. For example, safe operation of the robot is realized by setting a position and size of the operation prohibited region when setting the operation prohibited region.

However, in the system described in JP-A-2018-180725, there is a problem that setting is difficult depending on the position and shape of the operation prohibited region to be set, the setting operation is complicated, and a long time is required for setting.

SUMMARY

A setting device of the present disclosure includes a display section configured to display a restriction region setting image including a first input section for selecting and inputting either a restriction region of a permitted region where intrusion of a robot arm of a robot is permitted or a prohibited region where intrusion of the robot arm is prohibited and a second input section for inputting a boundary of the restriction region; an acquisition section configured to acquire setting information input and set in the first input section and the second input section; and a process section configured to set the restriction region for the robot arm based on the setting information acquired by the acquisition section.

A setting method of the present disclosure includes a displaying step of displaying a restriction region setting image including a first input section for selecting and inputting either a restriction region of a permitted region where intrusion of a robot arm of a robot is permitted and a prohibited region where intrusion of the robot arm is prohibited, and a second input section for inputting a boundary of the restriction region; an acquiring step of acquiring setting information input and set in the first input section and the second input section; and a processing step of performing a process of setting the restriction region for the robot arm based on the setting information acquired in the acquiring step.

A non-transitory computer-readable e medium storing a setting program of the present disclosure, the setting program is for executing a displaying step of displaying a restriction region setting image including a first input section for selecting and inputting either a restriction region of a permitted region where intrusion of a robot arm of a robot is permitted and a prohibited region where intrusion of the robot arm is prohibited, and a second input section for inputting a boundary of the restriction region; an acquiring step of acquiring setting information input and set in the first input section and the second input section; and a processing step of performing a process of setting the restriction region for the robot arm based on the setting information acquired in the acquiring step.

DESCRIPTION OF EMBODIMENTS

Hereinafter, a setting device, a setting method, and a setting program of the present disclosure will be described in detail based on preferred embodiments shown in the accompanying drawings.

Embodiment

Figure 1:
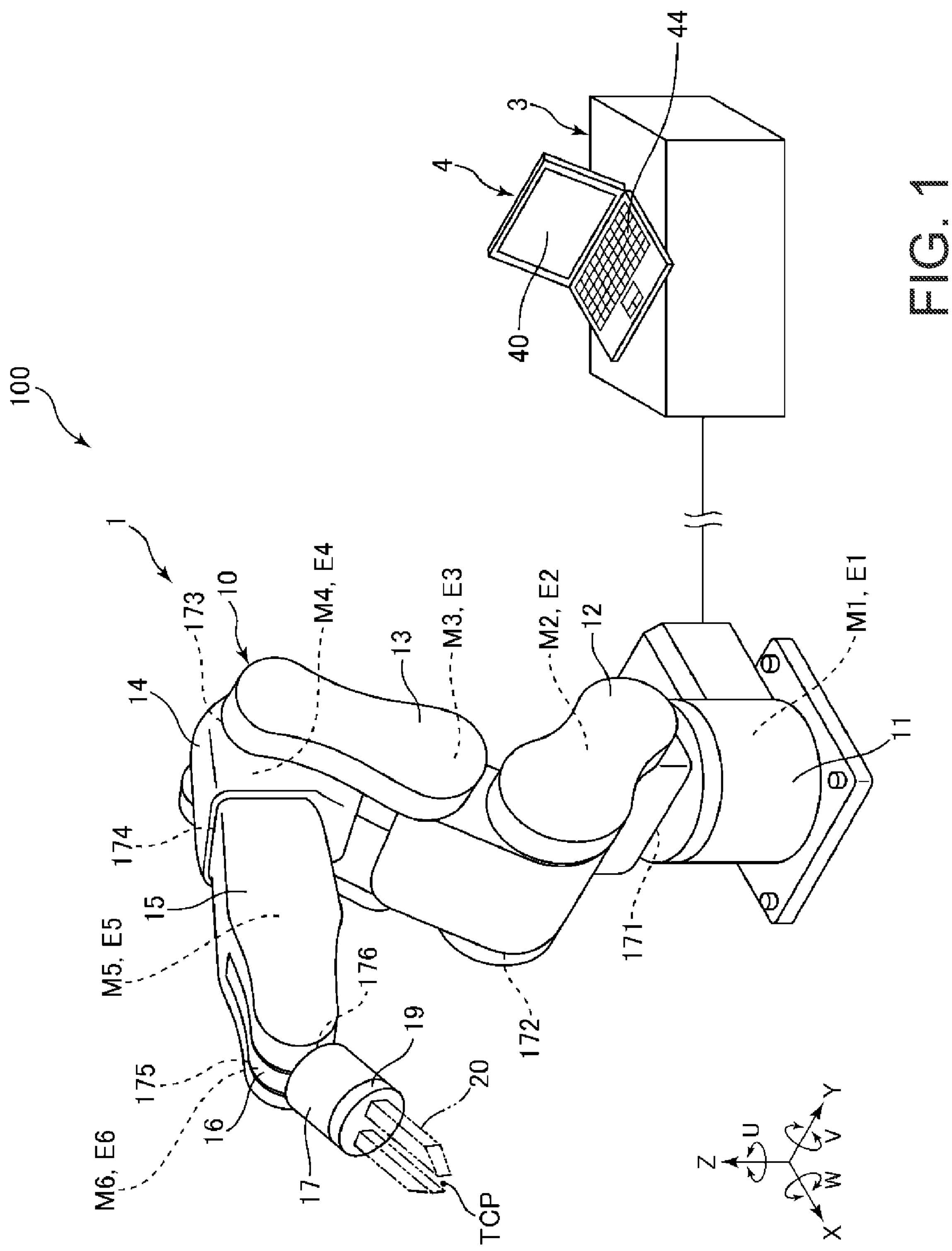
FIG. 1 is a diagram showing an overall configuration of a robot system including an embodiment of a setting device of the present disclosure.
Figure 2:
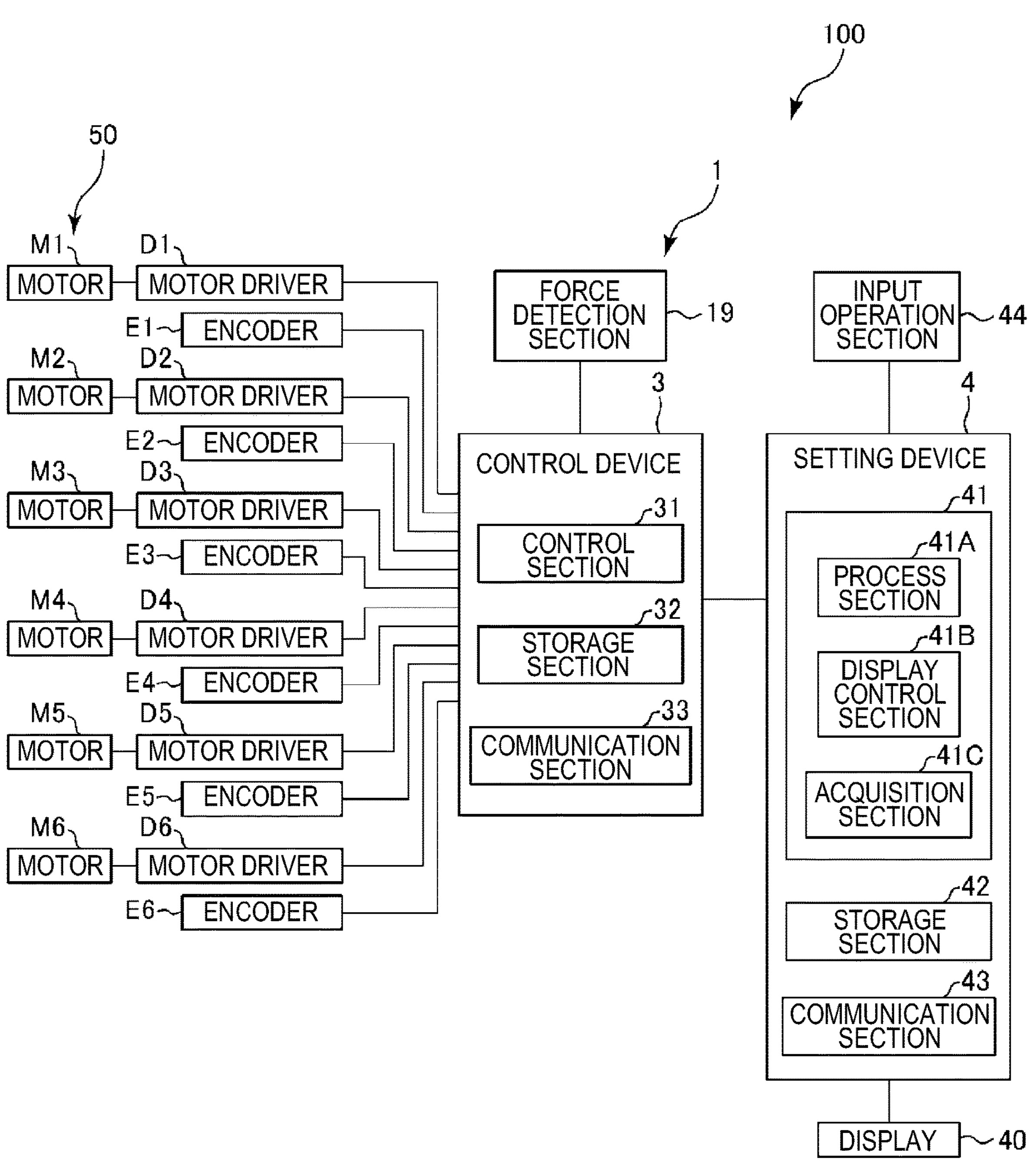
FIG. 2 is a block diagram of the robot system shown in FIG. 1.
Figure 3:
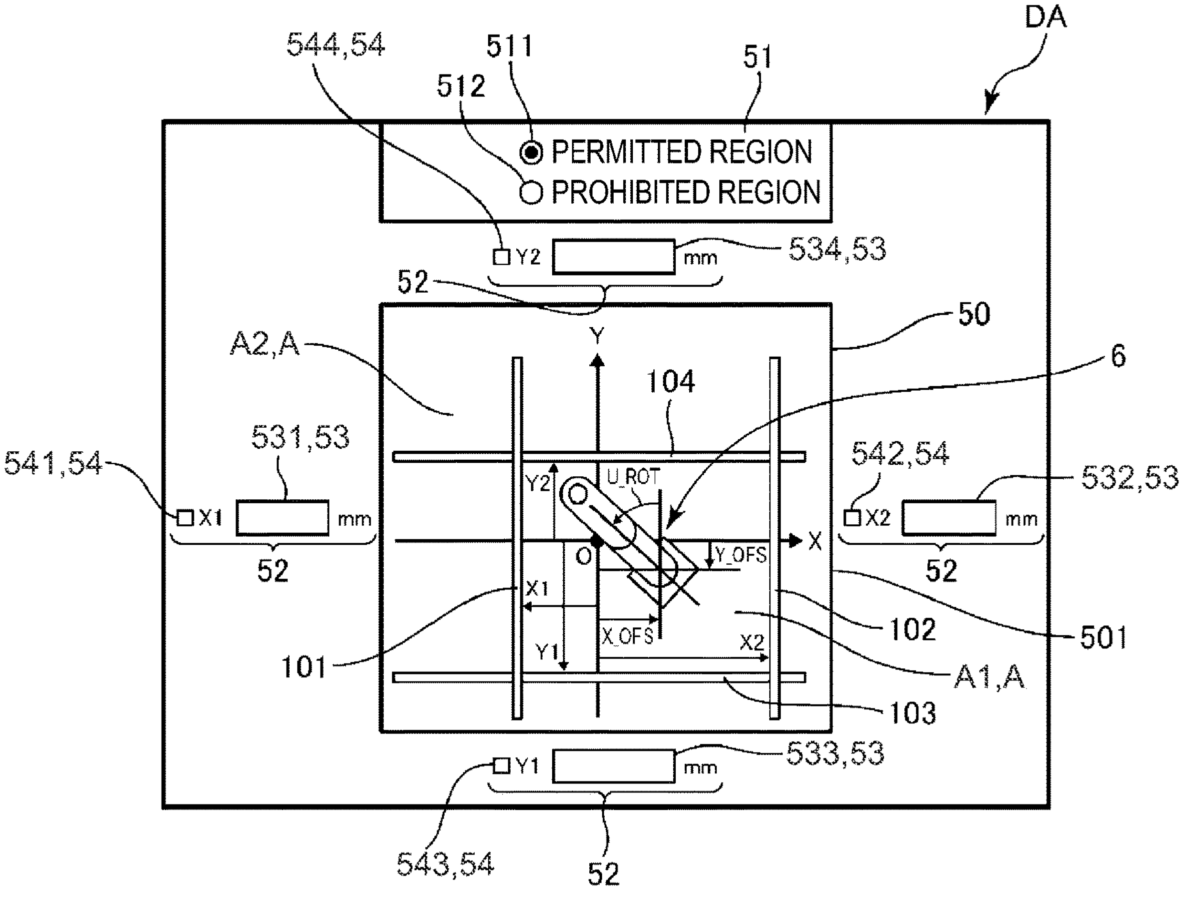
FIG. 3 is a diagram showing an example of a restriction region setting image displayed on a display section.
Figure 4:
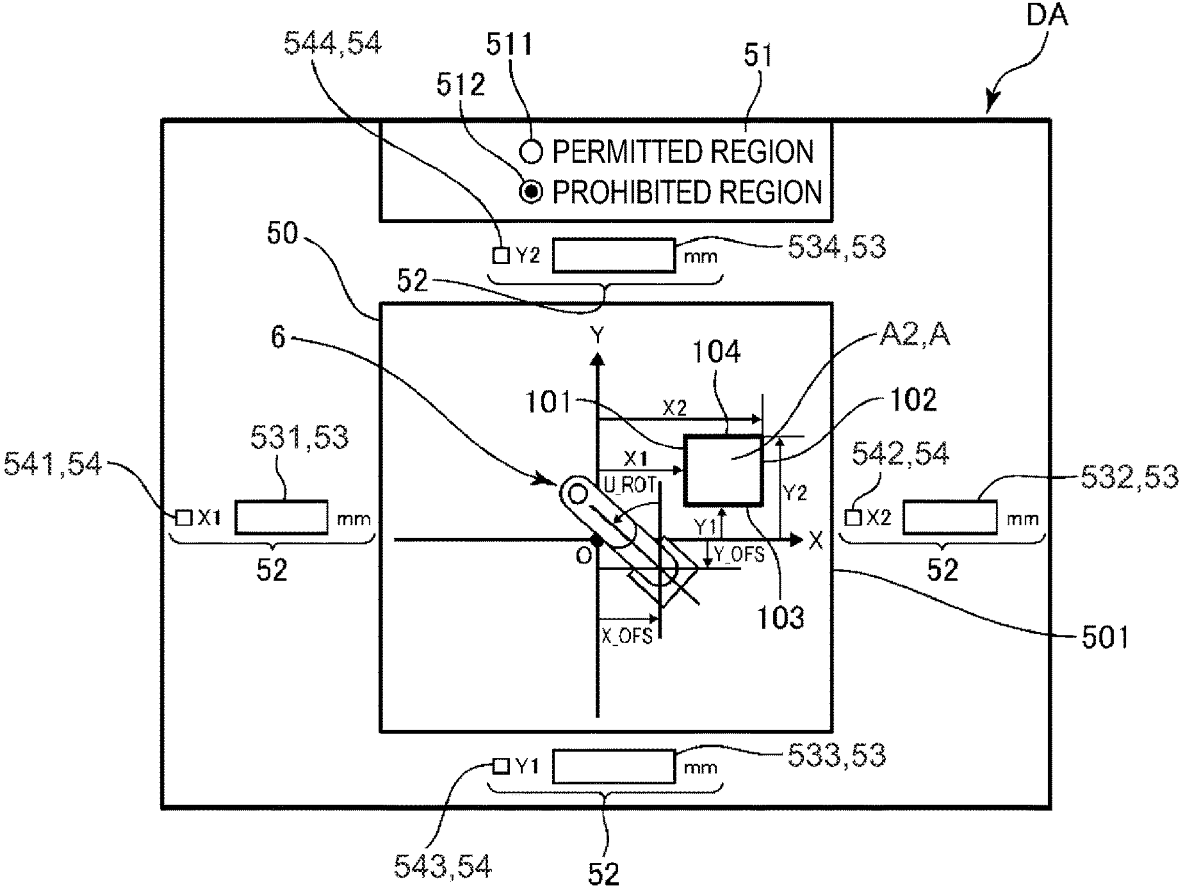
FIG. 4 is a diagram showing an example of the restriction region setting image displayed on the display section.
Figure 5:
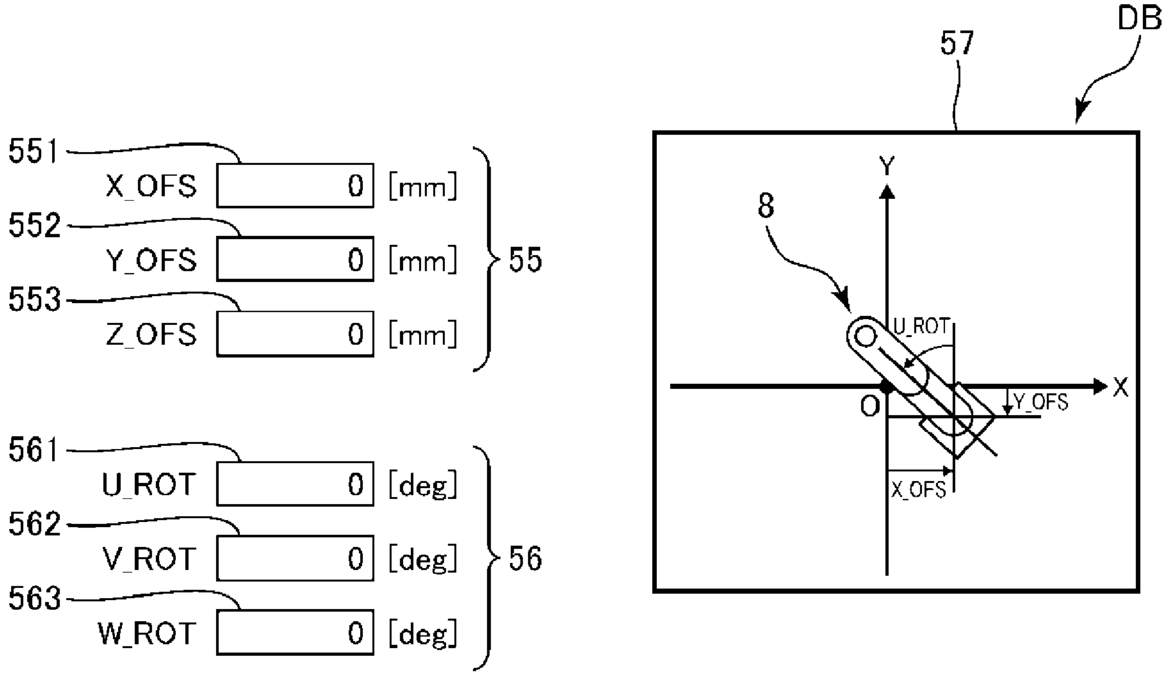
FIG. 5 is a diagram showing an example of a robot setting image displayed on the display section.
Figure 6:
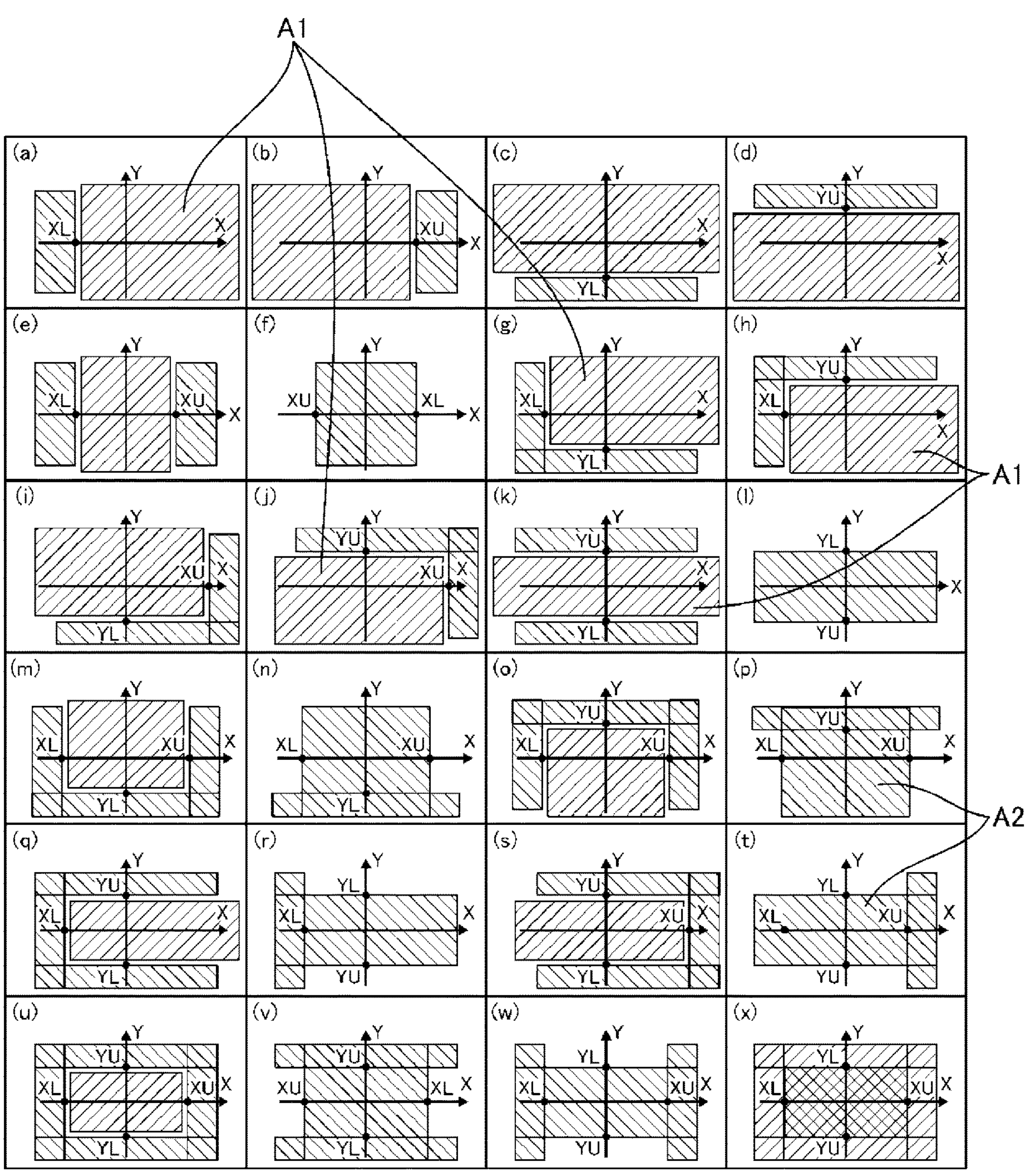
FIG. 6 is a diagram for explaining variations of a restriction region input and set using a fourth input section.
Figure 7:
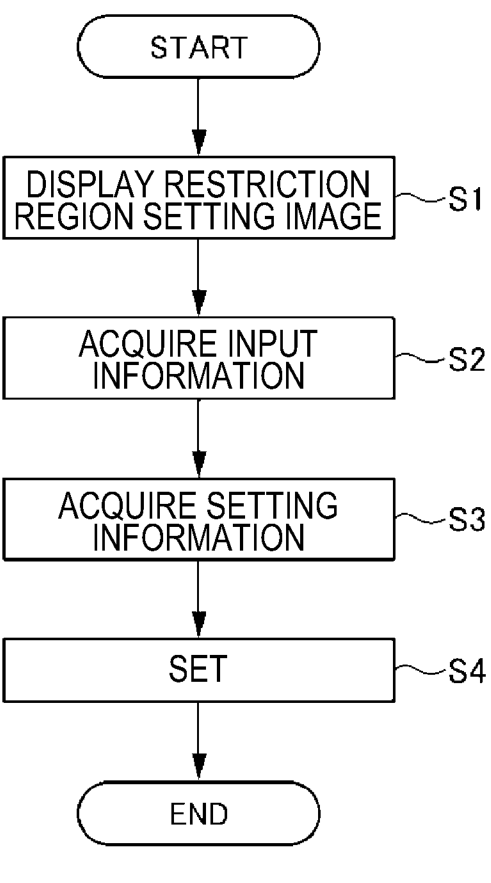
FIG. 7 is a flowchart for explaining an example of a setting method of the present disclosure.
Figure 8:
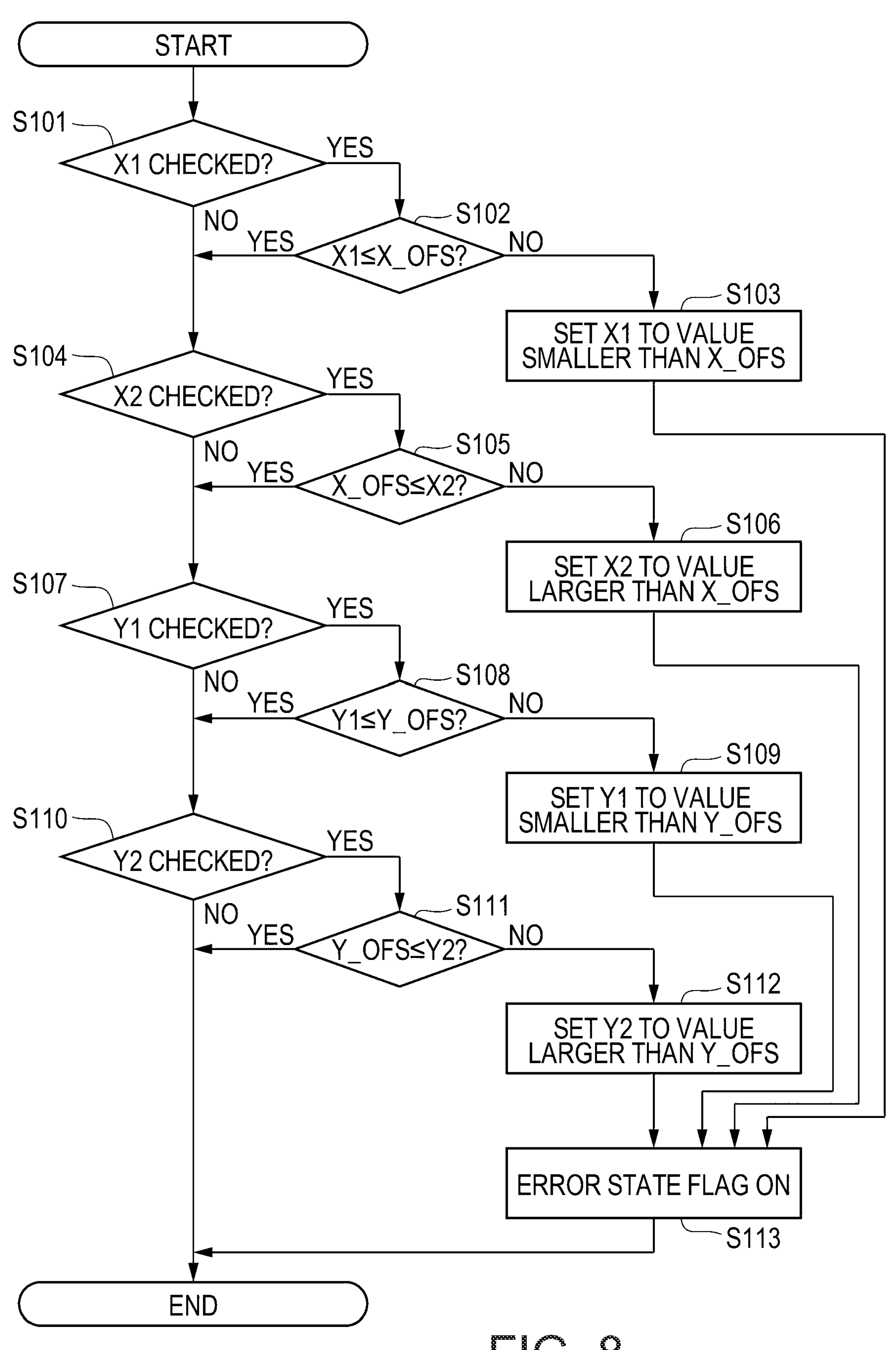
FIG. 8 is a flowchart for explaining an example of the setting method of the present disclosure.
Figure 9:
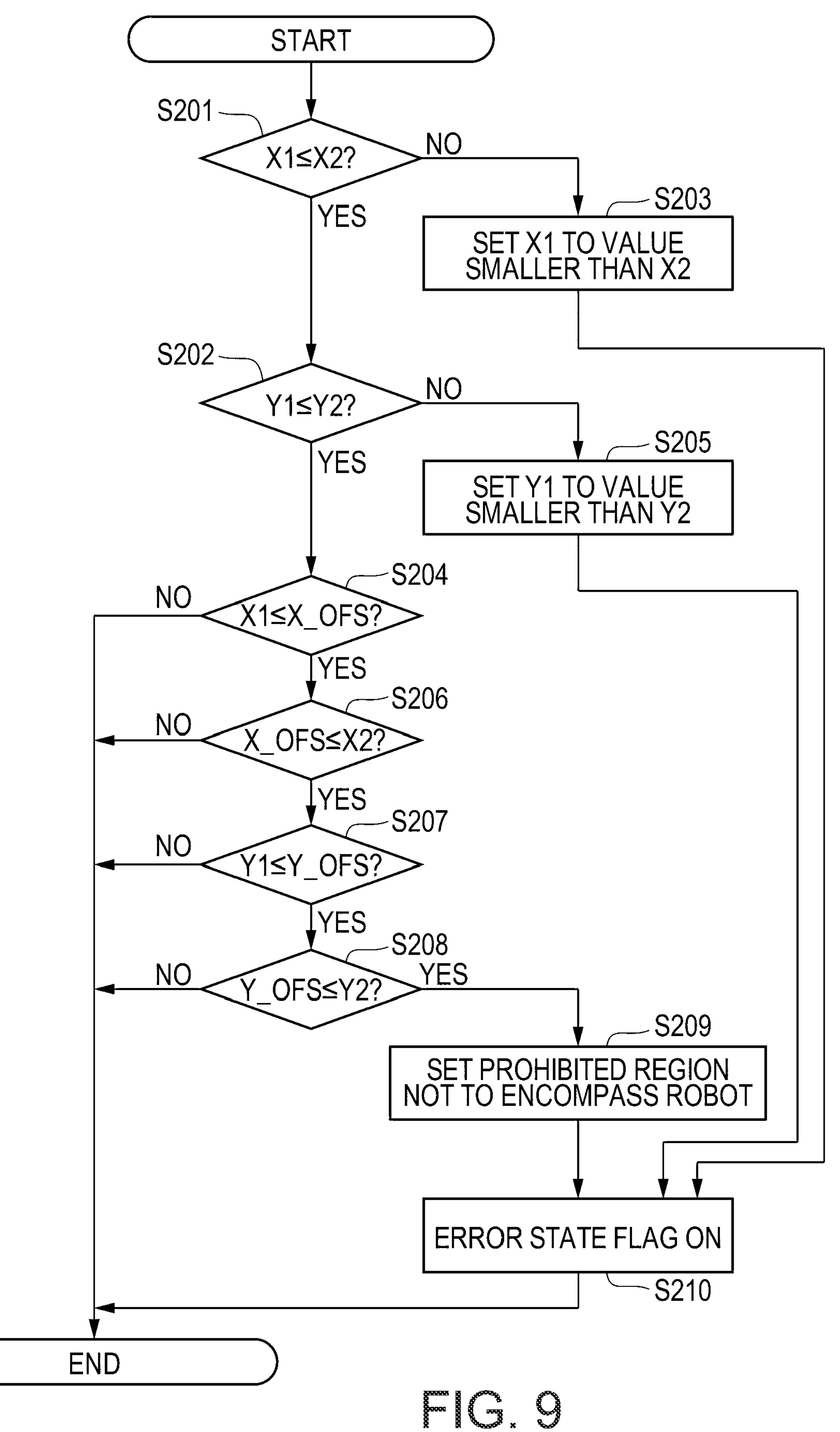
FIG. 9 is a flowchart for explaining an example of the setting method of the present disclosure.

FIG. 1 is a diagram showing an overall configuration of a robot system including an embodiment of a setting device of the present disclosure. FIG. 2 is a block diagram of the robot system shown in FIG. 1. FIGS. 3 and 4 are diagrams showing an example of a restriction region setting image displayed on a display section. FIG. 5 is a diagram showing an example of a robot setting image displayed on the display section. FIG. 6 is a diagram for explaining variations of a restriction region input and set using a fourth input section. FIGS. 7 to 9 are flowcharts for explaining an example of a setting method of the present disclosure.

Hereinafter, for convenience of description, a base 11 side of a robot arm 10 in FIG. 1 is referred to as a "base end", and the opposite side, that is, an end effector 20 side, is referred to as a "tip end". Hereinafter, for convenience of description, in FIG. 1, an X-axis, a Y-axis, and a Z-axis are axes orthogonal to each other, and a +Z-axis direction, that is, an upper side in FIG. 1, is referred to as "upper", and a −Z-axis direction, that is, a lower side in FIG. 1, is referred to as "lower". A Z-axis direction in FIG. 1, that is, the up and down directions are referred to as a "vertical direction", and an X-axis direction and a Y-axis direction, or an arbitrary direction on an X-Y plane is referred to as a "horizontal direction".

As shown in FIG. 1, a robot system 100 includes a robot 1, a control device 3 that controls the robot 1, and a setting device 4 that executes the setting method of the present disclosure.

First, the robot 1 will be described.

The robot 1 shown in FIG. 1 is a single-arm six axes vertical articulated robot in the present embodiment, and includes a base 11 and a robot arm 10. An end effector 20 can be attached to a tip end section of the robot arm 10. The end effector 20 may be a constituent element of the robot 1, or may be a separate member from the robot 1, that is, it may not be a constituent element of the robot 1.

The robot 1 is not limited to the shown configuration, and may be, for example, a double-arm type articulated robot. The robot 1 may be a horizontal articulated robot.

The base 11 is a support body that supports the robot arm 10 on a base end side thereof in a drivable manner, and is fixed to, for example, a floor in a factory. In the robot 1, the base 11 is electrically connected to the control device 3 via a relay cable. The connection between the robot 1 and the control device 3 is not limited to a wired connection as in the configuration shown in FIG. 1, and may be a wireless connection, for example. It may also be connected via a network such as the Internet.

In the present embodiment, the robot arm 10 includes a first arm 12, a second arm 13, a third arm 14, a fourth arm 15, a fifth arm 16, and a sixth arm 17, and these arms are connected in this order from a base 11 side toward a tip end side. The number of arms of the robot arm 10 is not limited to six, but may be one, two, three, four, five, or seven or more, for example. The size such as the total length of each arm is not particularly limited, and can be appropriately set.

The base 11 and the first arm 12 are connected to each other via a joint 171. The first arm 12 is pivotable with respect to the base 11 about a first pivot shaft with the first pivot shaft extending in the Z-axis direction as the pivot center. In this manner, the first pivot shaft coincides with the normal line of a floor surface of the floor to which the base 11 is fixed, and the entire robot arm 10 can rotate about the first pivot shaft in either a forward direction or a reverse direction.

The first arm 12 and the second arm 13 are connected to each other via a joint 172. The second arm 13 is pivotable with respect to the first arm 12 about a second pivot shaft extending in the horizontal direction.

The second arm 13 and the third arm 14 are connected to each other via a joint 173. The third arm 14 is pivotable with respect to the second arm 13 about a third pivot shaft extending in the horizontal direction. The third pivot shaft is parallel to the second pivot shaft.

The third arm 14 and the fourth arm 15 are connected to each other via a joint 174. The fourth arm 15 is pivotable with respect to the third arm 14 about a fourth pivot shaft parallel to a central axis direction of the third arm 14. The fourth pivot shaft is perpendicular to the third pivot shaft.

The fourth arm 15 and the fifth arm 16 are connected to each other via a joint 175. The fifth arm 16 is pivotable with respect to the fourth arm 15 about a fifth pivot shaft. The fifth pivot shaft is perpendicular to the fourth pivot shaft.

The fifth arm 16 and the sixth arm 17 are connected to each other via a joint 176. The sixth arm 17 is pivotable with respect to the fifth arm 16 about a sixth pivot shaft. The sixth pivot shaft is perpendicular to the fifth pivot shaft.

The sixth arm 17 is a robot tip end section of the robot arm 10 located at the most tip end side. The sixth arm 17 can be displaced together with the end effector 20 by driving the robot arm 10.

The end effector 20 shown in FIG. 1 includes a gripping section capable of gripping a workpiece or a tool. In a state where the end effector 20 is mounted on the sixth arm 17, a tip end section of the end effector 20 becomes a tool center point TCP.

The robot 1 includes a motor M1, a motor M2, a motor M3, a motor M4, a motor M5, and a motor M6 as drive sections, and an encoder E1, an encoder E2, an encoder E3, an encoder E4, an encoder E5, an encoder E6. The motor M1 is incorporated in the joint 171, and rotates the first arm 12 about the first pivot shaft with respect to the base 11. The motor M2 is incorporated in the joint 172 and relatively rotates the first arm 12 and the second arm 13 about the second pivot shaft. The motor M3 is incorporated in the joint 173 and relatively rotates the second arm 13 and the third arm 14 about the third pivot shaft. The motor M4 is incorporated in the joint 174 and relatively rotates the third arm 14 and the fourth arm 15 about the fourth pivot shaft. The motor M5 is incorporated in the joint 175, and relatively rotates the fourth arm 15 and the fifth arm 16 about the fifth pivot shaft. The motor M6 is incorporated in the joint 176 and relatively rotates the fifth arm 16 and the sixth arm 17 about the sixth pivot shaft.

The encoder E1 is incorporated in the joint 171 and detects a position of the motor M1. The encoder E2 is incorporated in the joint 172 and detects a position of the motor M2. The encoder E3 is incorporated in the joint 173 and detects a position of the motor M3. The encoder E4 is incorporated in the joint 174 and detects a position of the motor M4. The encoder E5 is incorporated in the fifth arm 16 and detects a position of the motor M5. The encoder E6 is incorporated in the sixth arm 17 and detects a position of the motor M6. It should be noted that "detect a position" here means detecting the rotation angle of the motor, that is, the rotation amount including forward and reverse rotation and the angular velocity, and the detected information is referred to as "position information".

As shown in FIG. 2, the motor drivers D1 to D6 are connected to the corresponding motors M1 to M6 to control the drive of each of these motors. The motor drivers D1 to D6 are incorporated in the joint 171, the joint 172, the joint 173, the joint 174, the fifth arm 16, and the sixth arm 17, respectively.

The encoders E1 to E6, the motors M1 to M6, and the motor drivers D1 to D6 are each electrically connected to the control device 3. The position information of the motors M1 to M6 detected by the encoders E1 to E6, that is, the rotation amount, is transmitted to the control device 3 as an electrical signal. Based on the position information, the control device 3 outputs a control signal to the motor drivers D1 to D6 shown in FIG. 2 to drive the motors M1 to M6. That is, controlling the robot arm 10 means controlling the drive of the motors M1 to M6 to control the operation of the first arm 12 to the sixth arm 17 belonging to the robot arm 10.

In the robot 1, a force detection section 19 that detects a force is detachably provided at a predetermined position of the robot arm 10, that is, on a tip end side of the sixth arm 17 in the present embodiment. The force detection section 19 includes at least one force detection device. The robot arm 10 can be driven in a state where the force detection section 19 is installed. The force detection section 19 may be provided on the base 11.

The force detection device constituting the force detection section 19 is a sensor capable of detecting a force and a direction thereof, and is a six axes force sensor in the present embodiment. The force detection device of the force detection section 19 detects the magnitude of the force on three detection axes orthogonal to each other and the magnitude of the torque about the three detection axes. That is, it detects a force component in each of the axial directions of the X-axis, the Y-axis, and the Z-axis which are orthogonal to each other, a force component in a W direction about the X-axis, a force component in a V direction about the Y-axis, and a force component in a U direction about the Z-axis. The X-axis, the Y-axis and the Z-axis are axes orthogonal to each other in a robot coordinate system. In each of these coordinate systems, the X-axis, Y-axis, and Z-axis are set in the same manner as described above. The coordinate system in the setting device 4 also corresponds to this.

The force detection device of the force detection section 19 is not limited to a six axes force sensor, and may have another configuration. The force detection device of the force detection section 19 may be installed in advance in the base 11 or the robot arm 10.

The force detection device of the force detection section 19 can be detachably mounted on the end effector 20. In the present embodiment, the end effector 20 includes a pair of claw sections capable of approaching and separating from each other, and is constituted by a hand for gripping and releasing a workpiece or a tool by the claw sections. The force detection device mounted on the end effector 20 can detect the magnitude and direction of the reaction force of a gripping force when a workpiece is gripped by the both claw sections.

The end effector 20 is not limited to the configuration shown in the drawing, and may be configured to include a suction section, for example, and to hold a workpiece or a tool by suction of the suction section. The end effector 20 may be, for example, a tool such as a polishing device, a grinding device, a cutting device, a spray gun, a laser light irradiator, a screwdriver, or a wrench.

Next, the control device 3 and the setting device 4 will be described.

As shown in FIG. 1, in the present embodiment, the control device 3 is installed at a position away from the robot 1. However, the present disclosure is not limited to this configuration, and the control device 3 may be incorporated in the base 11. The control device 3 has a function of controlling the drive of the robot 1, and is electrically connected to each section of the robot 1 described above. The control device 3 includes a control section 31, a storage section 32, and a communication section 33. These sections are connected so as to be able to communicate with each other, for example, via a bus.

The control section 31 includes one or more processors. The control section 31 is composed of, for example, a central processing unit (CPU), and reads out and executes various programs such as an operation program stored in the storage section 32. The signal generated by the control section 31 is transmitted to each section of the robot 1 via the communication section 33, and the signal from each section of the robot 1 is received by the control section 31 via the communication section 33. Thus, the robot arm 10 can perform predetermined operations under a predetermined condition.

The storage section 32 stores various programs to be executed by the control section 31. Examples of the storage section 32 include a volatile memory such as a random access memory (RAM), a nonvolatile memory such as a read only memory (ROM), and a removable external storage device.

The communication section 33 includes an interface circuit, and transmits and receives signals to and from the control device 3 using an external interface such as a wired local area network (LAN) or a wireless LAN. The communication section 33 may include a terminal for connecting a cable for performing wired communication for performing wireless communication. In this case, communication may be performed via a server (not shown), or via a network such as the Internet.

As shown in FIGS. 1 and 2, the setting device 4 is a device for setting a restriction region A (to be described later) for the robot 1, and is composed of a laptop computer including a display 40 as a display section and an input operation section 44. The setting device 4 may also serve as a teaching device for teaching an operation program to the robot 1.

The input operation section 44 includes a keyboard and a mouse (not shown), and an operator operates the keyboard and the mouse to input various information. The display 40 is formed of, for example, liquid crystal, organic electroluminescence, or the like, and can display various display screens in color or monochrome. The display 40 displays a restriction region setting image DA, a robot setting image DB, and the like (to be described later). The restriction region setting image DA and the robot setting image DB may be displayed on the display 40 at the same time, or may be sequentially or timely displayed by an image switching operation or the like.

The setting device 4 is not limited to a laptop computer, and may be a desktop computer, a tablet computer, or the like. When the setting device 4 is a tablet computer or the like, a touch screen may be used as the input operation section 44. The display section is not limited to the display 40, and may be, for example, an image projection section that projects the restriction region setting image DA or the like by a projector.

The control section 41 shown in FIG. 2 is constituted by at least one processor such as a central processing unit (CPU), for example, and reads out and executes various programs, for example, a setting program of the present disclosure, stored in the storage section 42.

The control section 41 has a function of setting a restriction region A (to be described later), a function of controlling an operation of the display 40, and the like. Hereinafter, among the processors, a processor for performing a process of setting the restriction region A for the robot arm is referred to as a process section 41A, a processor for controlling an operation of the display 40 is referred to as a display control section 41B, and a processor for acquiring setting information inputted by an operator operating the input operation section 44 is referred to as an acquisition section 41C. The process section 41A and the display control section 41B are collectively referred to as the control section 41.

The storage section 42 stores various programs and the like executable by the control section 41. Examples of the storage section 42 include a volatile memory such as a random access memory (RAM), a nonvolatile memory such as a read only memory (ROM), and a removable external storage device. The storage section 42 stores a setting program of the present disclosure. However, the present disclosure is not limited to this configuration, and the setting program of the present disclosure may be stored in the storage section 32 or in an external storage device.

The communication section 43 includes an interface circuit, and transmits and receives signals to and from the control device 3 using an external interface such as a wired local area network (LAN) or a wireless LAN. In this case, communication may be performed via a server (not shown), or via a network such as the Internet. The communication section 43 transmits, to the control device 3, information relating to an operation program stored in the storage section 42. The communication section 43 can also receive information stored in the storage section 32 and store information in the storage section 42.

The acquisition section 41C acquires setting information input by an operator. The setting information acquired by the acquisition section 41C is stored in the storage section 42.

Next, the restriction region setting image DA and the robot setting image DB displayed on the display 40 will be described. The control section 41 generates image data of the restriction region setting image DA and the robot setting image DB based on a setting program, and controls an operation of the display 40 so as to display the generated image data on the display 40. Prior to operating the robot 1, an operator performs an input operation on the restriction region setting image DA and the robot setting image DB using the input operation section 44. The acquisition section 41C acquires and captures setting information inputted and set by using the input operation section 44. Then, the process section 41A stores the setting information in the storage section 42, thereby completing the various settings.

As shown in FIGS. 3 and 4, the restriction region setting image DA is a screen for performing various settings of the type, position, size, and the like of the restriction region A, which is a region for specifying restriction of the operation region, for the robot arm 10. An operator performs the above-described setting by operating the input operation section 44 while viewing the restriction region setting image DA. The restriction region setting image DA includes a first input section 51, a second input section 52, and a display region 50. The second input section 52 includes a third input section 53 and a fourth input section 54.

A robot coordinate system defined by the X-axis, the Y-axis, and the Z-axis orthogonal to each other is displayed in the restriction region setting image DA. An axis along the horizontal direction in FIGS. 3 to 6 is the X-axis, an axis along the up and down directions in FIGS. 3 to 6 is the Y-axis, and an axis along a direction perpendicular to a paper surface in FIGS. 3 to 6 is the Z-axis. A point at which the X-axis, the Y-axis, and the Z-axis intersect is the origin O. A right side of the X-axis is a "+" side, a left side is a "−" side, an upper side of the Y-axis is a "+" side, a lower side is a "−" side, a front side of the Z-axis is a "+" side, and a back side of the Z-axis is a "−" side. In this case, "along the vertical direction" in FIGS. 3 to 6 corresponds to "along the Z-axis direction", that is, "along a direction from a near side to a far side on a paper surface" or "along a direction from a far side to a near side on a paper surface".

The first input section 51 selects the type of the restriction region A for the robot arm 10. Types of the restriction region A include a permitted region A1 in which intrusion of the robot arm 10 is permitted and a prohibited region A2 in which intrusion of the robot arm 10 is prohibited. That is, the permitted region A1 and the prohibited region A2 are collectively referred to as the restriction region A.

The first input section 51 includes two radio buttons 511 and 512. The radio button 511 and the radio button 512 are arranged in the vertical direction in this order from the top. However, the present disclosure is not limited to this configuration, and the radio button 511 and the radio button 512 may be arranged in the vertical direction in this order from the bottom, and the radio button 511 and the radio button 512 may be arranged in the horizontal direction.

On a right side of the radio button 511, a character "PERMITTED REGION" is displayed, and on a right side of the radio button 512, a character "PROHIBITED REGION" is displayed. For example, a cursor displayed on the restriction region setting image DA is moved with a mouse, and a desired one of the radio button 511 and the radio button 512 is pressed, whereby one of the radio buttons is selected and input is performed.

An image of the display region 50 is switched according to a selection result of the radio buttons 511 and 512. FIG. 3 is a diagram showing a state where the permitted region A1 is selected, and FIG. 4 is a diagram showing a state where the prohibited region A2 is selected.

The input form of the first input section 51 is not limited to the above configuration, and may be, for example, a configuration in which a check box is formed and each check box is selected, a configuration in which a text box is formed and a character string is input by a keyboard or a voice input device, or a configuration in which selection is performed in a drop-down list format.

When the first input section 51 is input, a target of a condition input by a second input section 52 to be described below is selected to be the permitted region A1 or the prohibited region A2.

The second input section 52 is a section for inputting a boundary of the restriction region A. That is, a position of a boundary of the restriction region A input by the first input section 51 is input. The restriction region A is a rectangular area including a first surface 101, a second surface 102, a third surface 103, and a fourth surface 104, which are different from each other in position along the vertical direction, as boundaries. That is, each of the first surface 101, the second surface 102, the third surface 103, and the fourth surface 104 is a boundary. The first surface 101 is located on a-side in the X-axis direction than the second surface 102, and is parallel to a Y-Z plane. The second surface 102 is located on a + side in the X-axis direction than the first surface 101, and is parallel to the Y-Z plane. The third surface 103 is located on a − side in the Y-axis direction than the fourth surface 104, and is parallel to an X-Z plane. The fourth surface 104 is located on a + side in the Y-axis direction than the third surface 103, and is parallel to the X-Z plane.

A display region 50 is provided on a lower side of the first input section 51 in FIG. 3, and a simulation image showing the restriction region A, the robot 1, the X-axis, the Y-axis, the first surface 101, the second surface 102, the third surface 103, and the fourth surface 104 are displayed in the display region 50. The simulation image is an image of the robot 1 viewed from a +Z-axis side.

In the display region 50, a simulation image of the robot 1 is displayed as a virtual robot 6, and is an image indicating information of at least one of a position, shape, size (dimension), installation direction, installation angle, and posture of the robot 1.

The acquisition section 41C acquires and captures input information input in the first input section 51 and the second input section 52. Then, the display control section 41B reflects the captured information on a simulation image in the display region 50 of the restriction region setting image DA in real time. That is, positions of the first surface 101, the second surface 102, the third surface 103, and the fourth surface 104 are changed in real time based on input information input in the first input section 51 and the second input section 52. Thus, an operator can perform setting while confirming input contents at the first input section 51 and the second input section 52.

Here, the "input information" is information input by an operator using the first input section 51, the second input section 52, a third input section 53, and a fourth input section 54, which will be described later, and is information that has not yet been determined. On the other hand, "setting information" (to be described later) is information in which the input information is confirmed, and is information used in an actual operation.

Positions of the first surface 101, the second surface 102, the third surface 103, and the fourth surface 104 can be set by operating the second input section 52 while viewing the display region 50. This will be described below.

The second input section 52 is provided at a total of four positions on upper, lower, left, and right sides of the display region 50 in FIG. 3. Each of the second input sections 52 includes a third input section 53 and a fourth input section 54, which are arranged side by side in a lateral direction in FIG. 3.

The third input section 53 is for inputting positions of the first surface 101, the second surface 102, the third surface 103, and the fourth surface 104, which are boundaries of the restriction region A, that is, distances X1, X2, Y1, and Y2 from the origin O as numerical values (numerals). The unit is "mm". In other words, the first surface 101 is set at a position separated from the origin O by a distance X1, the second surface 102 is set at a position separated from the origin O by a distance X2, the third surface 103 is set at a position separated from the origin O by a distance Y1, and the fourth surface 104 is set at a position separated from the origin O by a distance Y2.

The third input section 53 includes a text box 531 for inputting a position of the first surface 101 as a numerical value, a text box 532 for inputting a position of the second surface 102 as a numerical value, a text box 533 for inputting a position of the third surface 103 as a numerical value, and a text box 534 for inputting a position of the fourth surface 104 as a numerical value.

In the restriction region setting image DA, the text box 531 is located on a left side of the display region 50, the text box 532 is located on a right side of the display region 50, the text box 533 is located on a lower side of the display region 50, and the text box 534 is located on an upper side of the display region 50.

By inputting a numerical value into the text box 531, it is possible to set the distance X1 on a-side in the X-axis direction from the origin O of the X-axis. By inputting a numerical value into the text box 532, it is possible to set the distance X2 on a + side in the X-axis direction from the origin O of the X-axis. By inputting a numerical value into the text box 533, it is possible to set the distance Y1 on a-side in the Y-axis direction from the origin O of the Y-axis. By inputting a numerical value into the text box 534, it is possible to set the distance Y2 on a + side in the Y-axis direction from the origin O of the Y-axis.

Each of the text box 531, the text box 532, the text box 533, and the text box 534 may be configured to input positive numbers or numbers with a positive sign or a negative sign.

As shown in FIG. 3, when the permitted region A1 is selected by the first input section 51, a portion surrounded by the first surface 101, the second surface 102, the third surface 103, and the fourth surface 104 becomes the permitted region A1. The first surface 101, the second surface 102, the third surface 103, and the fourth surface 104 are defined by input in the second input section 52. The permitted region A1 is displayed (shown) in the display region 50 as a simulation image together with the robot 1.

On the other hand, as shown in FIG. 4, when the prohibited region A2 is selected by the first input section 51, a portion surrounded by the first surface 101, the second surface 102, the third surface 103, and the fourth surface 104 becomes the prohibited region A2. The first surface 101, the second surface 102, the third surface 103, and the fourth surface 104 are defined by input in the second input section 52. The prohibited region A2 is displayed (shown) in the display region 50 as a simulation image together with the robot 1.

Regardless of which of the permitted region A1 and the prohibited region A2 is selected in the first input section 51, the position and size of the permitted region A1 or the prohibited region A2, particularly the position and size of the permitted region A1 or the prohibited region A2 with respect to the robot 1, can be set by inputting and setting the positions of the first surface 101, the second surface 102, the third surface 103, and the fourth surface 104 by the second input section 52.

In the related art, there is no configuration in which a screen for setting a region corresponding to the permitted region A1 and a screen for setting a region corresponding to the prohibited region A2 are selected. For this reason, it has not been possible to perform an input suitable for the shape and size of a region to be set. On the other hand, in the setting device 4, the type of the restriction region A is selected via the first input section 51 in accordance with the size and the shape of the restriction region A desired to be set, and the boundaries of the restriction region A that were set via the second input section 52 are set. By this, it is possible to easily and quickly set the type of the restriction region A and the boundary of the restriction region A in accordance with the type.

When an operator performs a confirmation operation such as pressing a "confirmation button" (not shown) after performing input using the first input section 51 and the second input section 52, the setting information that was input and set in the first input section 51 and the second input section 52 is acquired and captured by the acquisition section 41C. Then, the process section 41A stores the captured setting information in the storage section 42, thereby completing various settings.

As described above, the setting device 4 includes the display 40 as a display section configured to display the restriction region setting image DA including the first input section 51 for selecting and inputting either the restriction region A of the permitted region A1 where intrusion of the robot arm 10 of the robot 1 is permitted or the prohibited region A2 where intrusion of the robot arm 10 is prohibited and the second input section 52 for inputting a boundary of the restriction region A; the acquisition section 41C configured to acquire setting information input and set in the first input section 51 and the second input section 52; and the process section 41A configured to set the restriction region A for the robot arm 10 based on the setting information acquired by the acquisition section 41C. Thus, the type of the restriction region A and the boundary of restriction region A can be easily and quickly set.

An operator may perform input using the first input section 51 after performing an input using the second input section 52. That is, an operation order of the first input section 51 and the second input section 52 may be an order of the first input section 51 and the second input section 52, or an order of the second input section 52 and the first input section 51. The restriction region A is a region including as boundaries the first surface 101, the second surface 102, the third surface 103, and the fourth surface 104, which are different from each other in position along the vertical direction and the second input section 52 includes the third input section 53 for inputting positions of the first surface 101, the second surface 102, the third surface 103, and the fourth surface 104. By this, the restriction region A including the first surface 101, the second surface 102, the third surface 103, and the fourth surface 104 as boundaries can be easily and accurately set.

The restriction region A is not limited to the above shape, but may be a circle, an ellipse, a triangle, a pentagon or a polygon as viewed from the Z-axis direction. For example, when the restriction region A is circular, the second input section 52 may be configured to include an input section for inputting coordinates of the center of a circle of the restriction region A and an input section for inputting the radius or diameter of the circle. A configuration may be adopted in which a trajectory is drawn on the display region 50 by operating a mouse or a touch screen, and the restriction region A is set with the drawn trajectory as a boundary. In this case, the display region 50 corresponds to the second input section 52.

In the present embodiment, the boundary in the X-axis direction and the boundary in the Y-axis direction of the restriction region A are set, but the present disclosure is not limited to this, and the boundary in the Z-axis direction of the restriction region A may be set.

As described above, the restriction region setting image DA includes the restriction region A input by the first input section 51 and the second input section 52, and the display region 50 for displaying a simulation image showing the robot 1. Thus, an operator can set the restriction region A while confirming the simulation image. In particular, setting can be performed while grasping a positional relationship of the restriction region A with respect to the robot 1, and more appropriate setting can be easily performed.

In the display region 50, the restriction region A corresponding to input by the second input section 52 is displayed. Thus, it is possible to perform input and setting in the first input section 51 and the second input section 52, while confirming input content.

As shown in FIGS. 3 and 4, the second input section 52 includes a fourth input section 54 for inputting whether setting of each of the third input sections 53 is to be made effective or not. The fourth input section 54 selects and inputs whether or not positions of the first surface 101, the second surface 102, the third surface 103, and the fourth surface 104 are to be made effective.

The fourth input section 54 includes four check boxes 541, 542, 543, and 544. The check box 541 is located on a left side of the text box 531, the check box 542 is located on a left side of the text box 532, the check box 543 is located on a left side of the text box 533, and the check box 544 is located on a left side of the text box 534.

Each of the check boxes 541, 542, 543, and 544 is checked when a cursor is placed and pressed once and, as shown in FIG. 3 is unchecked, that is, erased, when the cursor is pressed again.

When the check boxes 541 to 544 are checked, input in adjacent text boxes 531 to 534 (in the same second input section 52) are made effective. That is, the boundaries of the first surface 101 to the fourth surface 104 corresponding to the text box are set corresponding to a numerical value input in the text box.

When the check boxes 541 to 544 are unchecked, input in adjacent text boxes 531 to 534 (in the same second input section 52) becomes invalid. That is, regardless of the presence or absence of an input of a numerical value to the text box, there is no boundary by the first surface 101 to the fourth surface 104 corresponding to the text box.

By placing a cursor to the check box 541, selecting the number of times of pressing, and unchecking the check box 541, input in the text box 531 becomes invalidated. That is, the boundary by the first surface 101 will no longer exist.

By placing a cursor to the check box 542, selecting the number of times of pressing, and unchecking the check box 542, an input in the text box 532 becomes invalidated. That is, the boundary by the second surface 102 will no longer exist.

By placing a cursor to the check box 543, selecting the number of times of pressing, and unchecking the check box 543, an input in the text box 533 becomes invalidated. That is, the boundary by the third surface 103 will no longer exist.

By placing a cursor to the check box 544, selecting the number of times of pressing, and unchecking the check box 544, an input in the text box 534 becomes invalidated. That is, the boundary by the fourth surface 104 will no longer exist.

Here, a case where the boundary by the first surface 101 does not exist can be considered to be the same as a case where the first surface 101 is placed at infinity. The same applies to the second surface 102 to the fourth surface 104.

By selecting whether or not to uncheck the check boxes 541, 542, 543, and 544, various restriction regions A can be set, for example, as shown in (a) to (x) in FIG. 6. In FIG. 6, a region indicated by hatching rising to the right is the permitted region A1, and a region indicated by hatching rising to the left is the prohibited region A2.

In (a) of FIG. 6, when the permitted region A1 is selected by the first input section 51, the check box 541 is checked to set the boundary by the first surface 101, and the check boxes 542, 543, and 544 are unchecked to eliminate the boundaries by the second surface 102 to the fourth surface 104.

In (j) of FIG. 6, when the permitted region A1 is selected by the first input section 51, the check boxes 542 and 544 are checked to set the boundaries by the second surface 102 and the fourth surface 104, and the check boxes 541 and 543 are unchecked to eliminate the boundaries by the first surface 101 and the third surface 103.

By providing the fourth input section 54 including the above-described configuration, it is possible to eliminate the boundary by the corresponding surface of the first surface 101 to the fourth surface 104 by merely unchecking the check boxes 541 to 544, that is, by a simple operation.

As described above, the second input section 52 includes the fourth input section 54 for selecting and inputting whether or not positions of the first surface 101, the second surface 102, the third surface 103, and the fourth surface 104 are to be made effective and the process section 41A sets, as the restriction region A, a region including, as boundaries, surfaces validated by the fourth input section 54 among the first surface 101, the second surface 102, the third surface 103, and the fourth surface 104. Thus, various restriction regions A can be set. In particular, with a simple operation, it is possible to eliminate the boundary of the restriction region A in a predetermined direction, that is, the boundary by a predetermined surface of the first surface 101 to the fourth surface 104.

A robot setting image DB shown in FIG. 5 is displayed on the display 40. The robot setting image DB may be displayed together with the restriction region setting image DA, or may be displayed separately from the restriction region setting image DA.

When the robot setting image DB is displayed at the same time as the restriction region setting image DA, the robot setting image DB may be displayed so as to be superimposed on the restriction region setting image DA. When the robot setting image DB is displayed at the same time as the restriction region setting image DA, the robot setting image DB may be displayed on a display section different from the display 40.

When the robot setting image DB is displayed separately from the restriction region setting image DA, the restriction region setting image DA and the robot setting image DB may be switched by operating a switching operation section (not shown) for switching the restriction region setting image DA and the robot setting image DB.

The robot setting image DB includes a position input section 55 for inputting a position of the robot 1, a posture input section 56 for inputting a posture of the robot 1, and a robot display region 57 for displaying an image of the robot 1. Here, the position of the robot 1 refers to a position of the base 11, and the posture of the robot 1 refers to rotation positions of the base 11 about the X-axis, the Y-axis, and the Z-axis.

The position input section 55 includes text boxes 551, 552, and 553. The text box 551 is a portion for inputting a distance X_OFS from the origin O in the X-axis direction of the base 11 of the robot 1. The text box 552 is a portion for inputting a distance Y_OFS from the origin O in the Y-axis direction of the base 11 of the robot 1. The text box 553 is a portion for inputting a distance Z OFS from the origin O in the Z-axis direction of the robot 1. By inputting numerical values in these text boxes, the amount of deviation of an installation position of the robot 1 from the origin O can be set.

The posture input section 56 includes text boxes 561, 562, and 563. The text box 561 is a portion for inputting a rotation angle U_ROT of the robot 1 in the U direction, that is, about the Z-axis. The text box 562 is a portion for inputting a rotation angle V ROT of the robot 1 in the V direction, that is, about the Y-axis. The text box 563 is a portion for inputting a rotation angle W_ROT of the robot 1 in the W direction, that is, about the X-axis. By inputting numerical values to these text boxes, the posture of the robot 1 at an installation position can be set.

The robot display region 57 is arranged on a right side of the position input section 55 and the posture input section 56. A virtual robot 8, which is a simulation image of the robot 1 viewed from a +Z-axis side, is displayed in the robot display region 57. In the robot display region 57, a position and a posture of the virtual robot 8 are changed and displayed according to input results of the position input section 55 and the posture input section 56. By this, the position and the posture of the robot 1 can be easily and accurately set.

When an operator performs a confirmation operation such as pressing a "confirmation button" (not shown) after performing an input by the position input section 55 and the posture input section 56, the information of the set position and posture of the robot 1 inputted by the position input section 55 and the posture input section 56 is acquired and captured by the acquisition section 41C. Then, based on the acquired information, the display control section 41B reflects the information on the virtual robot 6 displayed in the display region 50 of the restriction region setting image DA. By this, an operator can set the restriction region A in consideration of the position and the posture of the robot 1 by the first input section 51 and the second input section 52.

In the present embodiment, the virtual robot 6 displayed in the display region 50 and the virtual robot 8 displayed in the robot display region 57 are interlocked with each other, but the present disclosure is not limited to this, and the virtual robot 6 and the virtual robot 8 may not be interlocked with each other.

In this way, the display 40 as the display section displays the robot setting image DB for setting the position and the posture of the robot 1. Thus, an operator can set the restriction region A in consideration of the position and the posture of the robot 1.

The robot setting image DB may be a screen for setting only the position of the robot 1 or a screen for setting only the posture of the robot 1. The robot setting image DB may be omitted.

Next, an example of a setting method of the present disclosure will be described with reference to a flowchart shown in FIG. 7.

As shown in FIG. 7, the setting method of the present disclosure includes step S1, step S2, step S3, and step S4.

In step S1, the restriction region setting image DA shown in FIG. 3 or FIG. 4 is displayed on the display 40. Step S1 is executed by the display control section 41B. Step S1 is a displaying step of displaying the restriction region setting image DA.

Next, an operator performs the operation as described above using the input operation section 44 to perform various settings. Then, the acquisition section 41C acquires the input information. The details of step S2 will be described later.

Next, in step S3, setting information is acquired. That is, when a confirmation operation (not shown) is performed, the acquisition section 41C acquires and captures the input information at that time as setting information. Step S3 is an acquiring step of acquiring the set setting information.

Next, in step S4, setting is performed. This step is executed when the process section 41A stores the setting information in the storage section 42. Step S4 is a processing step of setting the restriction region A for the robot arm 10.

Through such steps S1 to S4, the type of the restriction region A can be selected by the first input section 51 in accordance with the size and the shape of the restriction region A to be set, and the boundaries of the selected restriction region A can be input and set by the second input section 52. Thus, the boundary of the restriction region A can be easily and quickly set.

Next, step S2 will be described in detail.

In step S2, when the permitted region A1 is input by the first input section 51, steps S101 to S113 shown in FIG. 8 are executed, and when the prohibited region A2 is input by the first input section 51, steps S201 to S210 shown in FIG. 9 are executed.

First, a case where the permitted region A1 is input by the first input section 51 will be described.

In step S101, it is determined whether or not X1 is checked. That is, it is determined whether or not the check box 541 is checked. When it is determined in step S101 that X1 is checked, it is determined in step S102 whether or not X1≤X_OFS is satisfied. This determination is made based on whether or not a numerical value entered in the text box 531 is equal to or smaller than a set distance X_OFS.

In step S102, when it is determined to be X1≤X_OFS, the process proceeds to step S104, and when it is determined not to be X1≤X_OFS, the process proceeds to step S103.

In step S103, the content for notifying that X1 should be set to a value smaller than X_OFS is determined, and in step S113, the error state flag is on, that is, notification is performed. Here, a case of not being X1≤X_OFS indicates that the position of the base 11 is located outside the permitted region A1. By notifying that X1 is set to a value smaller than X_OFS, the position of the base 11 and the permitted region A1 can be appropriately set.

In step S104, it is determined whether or not X2 is checked. That is, it is determined whether or not the check box 542 is checked. When it is determined in step S104 that X2 is checked, it is determined in step S105 whether or not X_OFS≤X2 is satisfied. This determination is made based on whether or not a numerical value entered in the text box 532 is equal to or larger than a set distance X_OFS.

In step S105, when it is determined to be X_OFS≤X2, the process proceeds to step S107, and when it is determined not to be X_OFS≤X2, the process proceeds to step S106.

In step S106, the content for notifying that X2 should be set to a value larger than X_OFS is determined, and in step S113, notification is performed. Here, a case of not being X_OFS≤X2 indicates that a position of the base 11 is located outside the permitted region A1. By notifying that X2 should be set to a value larger than X_OFS, the position of the base 11 and the permitted region A1 can be appropriately set.

In step S107, it is determined whether or not Y1 is checked. That is, it is determined whether or not the check box 543 is checked. When it is determined in step S107 that Y1 is checked, it is determined in step S108 whether or not Y1≤Y_OFS is satisfied. This determination is made based on whether or not a numerical value entered in the text box 533 is equal to or smaller than a set distance Y_OFS.

In step S107, when it is determined to be Y1≤Y_OFS, the process proceeds to step S110, and when it is determined not to be Y1≤Y_OFS, the process proceeds to step S109.

In step S109, the content for notifying that Y1 should be set to a value smaller than Y_OFS is determined, and in step S113, notification is performed. Here, a case of not being Y1≤Y_OFS indicates that a position of the base 11 is located outside the permitted region A1. By notifying that Y1 should be set to a value smaller than Y_OFS, the position of the base 11 and the permitted region A1 can be appropriately set.

In step S110, it is determined whether or not Y2 is checked. That is, it is determined whether or not the check box 544 is checked. When it is determined in step S110 that Y2 is checked, it is determined in step S111 whether or not Y_OFS≤Y2 is satisfied. This determination is made based on whether or not a numerical value entered in the text box 534 is equal to or larger than a set distance Y_OFS.

In step 111, when it is determined not to be Y_OFS≤Y2, the process proceeds to step S112, and when it is determined to be Y_OFS≤Y2, the process is completed.

In step S112, the content for notifying that Y2 should be set to a value larger than Y_OFS is determined, and in step S113, notification is performed. Here, a case of not being Y_OFS≤Y2 indicates that a position of the base 11 is located outside the permitted region A1. By notifying that Y2 should be set to a value larger than Y_OFS, the position of the base 11 and the permitted region A1 can be appropriately set.

The input of the permitted region A1 is completed through steps S101 to S113.

Next, a case where the prohibited region A2 is input by the first input section 51 will be described.

In step S201, it is determined whether or not X1≤x2. This determination is made based on a numerical value entered in the text box 531 and a numerical value entered in the text box 532.

In step S201, when it is determined to be X1≤X2, the process proceeds to step S202, and when it is determined not to be X1≤X2, the process proceeds to step S203.

In step S203, the content for notifying that X1 should be set to a value smaller than X2 is determined, and in step S210, notification is performed. Here, a case of not being X1≤x2 indicates that the first surface 101 is not positioned on a-side in the X-axis direction compared to the second surface 102. By notifying that X1 should be set to a smaller value than X2, the first surface 101 can be set to be positioned on a-side in the X-axis direction compared to the second surface 102.

Next, in step S202, it is determined whether or not Y1≤Y2. This determination is made based on a numerical value entered in the text box 533 and a numerical value entered in the text box 534.

In step S202, when it is determined to be Y1≤Y2, the process proceeds to step S204, and when it is determined not to be Y1≤Y2, the process proceeds to step S205.

In step S205, the content for notifying that Y1 should be set to a value smaller than Y2 is determined, and in step S210, notification is performed. Here, a case of not being Y1≤Y2 indicates that the third surface 103 is not positioned on a-side in the Y-axis direction compared to the fourth surface 104. By notifying that Y1 should be set to a value smaller than Y2, the third surface 103 can be set to be positioned on a-side in the Y-axis direction compared to the fourth surface 104.

Next, in step S204, it is determined whether or not X1≤X_OFS. This determination is made based on whether or not a numerical value entered in the text box 531 is equal to or smaller than a set distance X_OFS. In step S204, when it is determined to be X1≤X_OFS, the process proceeds to step S206, and when it is determined not to be X1≤x_OFS, the process is completed. Next, in step S206, it is determined whether or not X_OFS≤X2. This determination is made based on whether or not a numerical value entered in the text box 532 is equal to or larger than a set distance X_OFS. In step S206, when it is determined to be X_OFS≤X2, the process proceeds to step S207, and when it is determined not to be X_OFS≤X2, the process is completed.

Next, in step S207, it is determined whether or not Y1≤Y_OFS. This determination is made based on whether or not a numerical value entered in the text box 533 is equal to or smaller than a set distance Y_OFS. In step S207, when it is determined to be Y1≤Y_OFS, the process proceeds to step S208, and when it is determined not to be Y1≤Y_OFS, the process is completed.

Next, in step S208, it is determined whether or not Y_OFS≤Y2. This determination is made based on whether or not a numerical value entered in the text box 534 is equal to or larger than a set distance Y_OFS. In step S208, when it is determined to be Y_OFS≤Y2, the process proceeds to step S209, and when it is determined not to be Y_OFS≤Y2, the process is completed.

In step S209, the content for notifying that settings should be set so that the prohibited region A2 does not encompass the robot 1 is determined, and in step S210, notification is performed. Here, a case where all of X1≤X_OFS, X_OFS≤X2, Y1≤Y_OFS, and Y_OFS≤Y2 are satisfied indicates that the position of the base 11 is located inside the prohibited region A2. It is possible to appropriately set the position of the base 11 and the prohibited region A2 by setting the prohibited region A2 so as not to encompass the robot 1, that is, by notifying that any one of X1, X2, Y1, and Y2 should be set to a value not satisfying the above conditions.

The input of the prohibited region A2 is completed through steps S201 to S210.

As described above, the setting method of the present disclosure includes a displaying of displaying step the restriction region setting image DA including the first input section 51 for selecting and inputting either the restriction region A of the permitted region A1 where intrusion of the robot arm 10 of the robot 1 is permitted and the prohibited region A2 where intrusion of the robot arm 10 is prohibited, and the second input section 52 for inputting a boundary of the restriction region A; an acquiring step of acquiring setting information input and set in the first input section 51 and the second input section 52; and a processing step of performing a process of setting the restriction region A for the robot arm 10 based on the setting information acquired in the acquiring step. By executing such steps, the type of the restriction region A and the boundaries of the restriction region A can be easily and quickly set.

As described above, the setting program of the present disclosure is for executing a displaying step of displaying the restriction region setting image DA including the first input section 51 for selecting and inputting either the restriction region A of the permitted region A1 where intrusion of the robot arm 10 of the robot 1 is permitted and the prohibited region A2 where intrusion of the robot arm 10 is prohibited, and the second input section 52 for inputting a boundary of the restriction region A; an acquiring step of acquiring setting information input and set in the first input section 51 and the second input section 52; and a processing step of performing a process of setting the restriction region A for the robot arm 10 based on the setting information acquired in the acquiring step. By executing such a setting program, the type of the restriction region A and the boundary of the restriction region A can be easily and quickly set.

The setting program of the present disclosure may be stored in a distributed manner in a plurality of locations such as the storage section 42, the storage section 32, and an external storage device.

Although the setting device, the setting method, and the setting program of the present disclosure have been described with reference to the embodiments shown in the drawings, the present disclosure is not limited thereto. Further, each section of the setting device can be replaced with an arbitrary structure capable of performing the same function. Further, an arbitrary structure may be added.

The setting method of the present disclosure may be one in which a step for an arbitrary purpose is added to the above-described embodiment.

In the present embodiment, a configuration in which the display control section 41B reflects captured information on a simulation image of the display region 50 of the restriction region setting image DA in real time has been described, but the present disclosure is not limited thereto. Instead of a simulation image, a guide image indicating the positional relationship between the first surface 101 to the fourth surface 104 may be displayed in the display region 50. As shown in display region 50 of FIG. 4, it is desirable that the guide image indicates that the first surface 101 is located on a – side in the X-axis direction compared with the second surface 102, the second surface 102 is located on a + side in the X-axis direction compared with the first surface 101, the third surface 103 is located on a – side in the Y-axis direction compared with the fourth surface 104, and the fourth surface 104 is located on a + side in the Y-axis direction compared with the third surface 103.

In the present embodiment, a configuration has been described in which the restriction region A can be set by selecting whether or not to uncheck the check boxes 541, 542, 543, and 544. The present disclosure is not limited to this, and when the prohibited region A2 is selected as the display region 50, the four check boxes 541, 542, 543, and 544 may not be changed from the state in which they are checked. In other words, when the prohibited region A2 is selected as the display region 50, positions of the first surface 101, the second surface 102, the third surface 103, and the fourth surface 104 may be always effective.

In a case where the prohibited region A2 is selected, the setting in which the entire region is divided into two or more by the prohibited region A2 is not performed by adopting a configuration in which the state in which the four check boxes 541, 542, 543, and 544 are checked cannot be changed. More specifically, setting to any of (f), (l), (n), (p), (r), (t), (v), and (w) in FIG. 6 is suppressed.

For example, when it is set as (f) in FIG. 6, a + side in the X-axis direction from XU and a – side in the X-axis direction from XL are set as the prohibited region A2. In other words, a region into which the robot arm 10 can intrude is a – side in the X-axis direction from XU, and a + side in the X-axis direction from XL. Here, when the base 11 is located on a – side in the X-axis direction from XU, when a setting is made to position a tip end section of the robot arm 10 on a + side in the X-axis direction from XL, any of the robot arms 10 provided between the base 11 and the tip end section of the robot arm 10 is in a posture straddling the prohibited region A2, and there is a possibility that an undesirable setting is performed. Therefore, by adopting a configuration in which the four check boxes 541, 542, 543, and 544 cannot be changed from the state in which they are checked when the prohibited region A2 is selected, it is possible to suppress an undesirable setting when the prohibited region A2 is selected.

What is claimed is:

1. A restriction region setting device for a robot, comprising:

a display configured to display a restriction region setting image including a robot image of the robot, a restriction region, a first input interface, and a second input interface, the second input interface being divided into a third input interface and a fourth input interface;

a memory configured to store a program;

a processor configured to execute the program so as to:

receive first setting information via the first input interface, the first setting information corresponding to one of:

a permitted region, as the restriction region, where intrusion of a robot arm of the robot is permitted; and a prohibited region, as the restriction region, where the intrusion of the robot arm is prohibited;

receive second setting information via the third and fourth input interfaces in the second input interface, the second setting information corresponding to a position and an individual enable state of each of first, second, third, and fourth vertical planes that define a boundary of the restriction region; and control an operation of the robot based on the second setting information, wherein the position of each of the first, second, third, and fourth vertical planes with respect to an origin point is defined by an input via the third input interface, the individual enable state of each of the first, second, third, and fourth vertical planes is determined by an input via the fourth input interface such that each of the first, second, third, and fourth vertical planes is set as one of:

defining part of the boundary of the restriction region by a corresponding one of the first, second, third, and fourth vertical planes; and making ineffective a corresponding one of the first, second, third, and fourth vertical planes as part of the boundary, the permitted region is in a first rectangular shape surrounded by the first, second, third, and fourth vertical planes in a state in which each of the first, second, third, and fourth vertical planes is in the individual enable state, and the prohibited region is in a second rectangular shape surrounded by the first, second, third, and fourth vertical planes in a state in which each of the first, second, third, and fourth vertical planes is in the individual enable state.

2. The setting device according to claim 1, wherein the robot image displayed on the display is a simulation image of the robot.

3. The setting device according to claim 2, wherein the restriction region corresponding to input by the second input interface is displayed around the robot image in the display, and the boundary of the restriction region is defined by selectively displaying at least enabled one of the first, second, third, and fourth vertical planes on the display.

4. The setting device according to claim 1, wherein the display is configured to display a robot setting image for setting a position and a posture of the robot.

5. A restriction region setting method for a robot for causing a processor to execute a process, the restriction region setting method comprising executing on the processor the steps of:

displaying a restriction region setting image including a robot image of the robot, a restriction region, a first input interface, and a second input interface, the second input interface being divided into a third input interface and a fourth input interface;

receiving first setting information via the first input interface, the first setting information corresponding to one of:

a permitted region, as the restriction region, where intrusion of a robot arm of the robot is permitted; and a prohibited region, as the restriction region, where the intrusion of the robot arm is prohibited;

receiving second setting information via the third and fourth input interfaces in the second input interface, the second setting information corresponding to a position and an individual enable state of each of first, second, third, and fourth vertical planes that define a boundary of the restriction region; and controlling an operation of the robot based on the second setting information, wherein the position of each of the first, second, third, and fourth vertical planes with respect to an origin point is defined by an input via the third input, interface, the individual enable state of each of the first, second, third, and fourth vertical planes is determined by an input via the fourth input interface such that each of the first, second, third, and fourth vertical planes is set as one of:

defining part of the boundary of the restriction region by a corresponding one of the first, second, third, and fourth vertical planes; and making ineffective a corresponding one of the first, second, third, and fourth vertical planes as part of the boundary, the permitted region is in a first rectangular shape surrounded by the first, second, third, and fourth vertical planes in a state in which each of the first, second, third, and fourth vertical planes is in the individual enable state, and the prohibited region is in a second rectangular shape surrounded by the first, second, third, and fourth vertical planes in a state in which each of the first, second, third, and fourth vertical planes is in the individual enable state.

6. A non-transitory computer-readable storage medium storing a setting program for causing a computer to execute a process by a processor so as to perform the steps of:

displaying a restriction region setting image including a robot image of the robot, a restriction region, a first input interface, and a second input interface, the second input interface being divided into a third input interface and a fourth input interface;

receiving first setting information via the first input interface, the first setting information corresponding to one of:

a permitted region, as the restriction region, where intrusion of a robot arm of the robot is permitted; and a prohibited region, as the restriction region, where the intrusion of the robot arm is prohibited;

receiving second setting information via the third and fourth input interfaces in the second input interface, the second setting information corresponding to a position and an individual enable state of each of first, second, third, and fourth vertical planes that define a boundary of the restriction region; and controlling an operation of the robot based on the second setting information, wherein the position of each of the first, second, third, and fourth vertical planes with respect to an origin point is defined by an input via the third input, and interface, the individual enable state of each of the first, second, third, and fourth vertical planes is determined by an input via the fourth input interface such that each of the first, second, third, and fourth vertical planes is set as one of:

defining part of the boundary of the restriction region by a corresponding one of the first, second, third, and fourth vertical planes; and making ineffective a corresponding one of the first, second, third, and fourth vertical planes as part of the boundary, the permitted region is in a first rectangular shape surrounded by the first, second, third, and fourth vertical planes in a state in which each of the first, second, third, and fourth vertical planes is in the individual enable state, and the prohibited region is in a second rectangular shape surrounded by the first, second, third, and fourth vertical planes in a state in which each of the first, second, third, and fourth vertical planes is in the individual enable state.

* * * * *